(12) United States Patent
Yokoyama et al.

(10) Patent No.: US 6,324,166 B1
(45) Date of Patent: Nov. 27, 2001

(54) CALL SETUP CONTROL APPARATUS IN ATM SWITCH

(75) Inventors: Hiroyuki Yokoyama, Tokyo; Hajime Nakamura, Saitama, both of (JP)

(73) Assignee: Kokusai Denshin Denwa Co., Ltd., Tokyo (JP)

( * ) Notice: Subject to any disclaimer, the term of this patent is extended or adjusted under 35 U.S.C. 154(b) by 0 days.

(21) Appl. No.: 09/109,898

(22) Filed: Jul. 2, 1998

(30) Foreign Application Priority Data

Jul. 17, 1997 (JP) .................................................. 9-207397

(51) Int. Cl.$^7$ .................................................. H04L 12/56
(52) U.S. Cl. .................................................. 370/234; 370/395
(58) Field of Search .................................................. 370/395, 396, 370/397, 398, 399, 230, 231, 232, 233, 234, 229, 412, 420, 463

(56) References Cited

U.S. PATENT DOCUMENTS

| 5,280,483 | * | 1/1994 | Kamoi et al. | 370/395 |
| 5,583,857 | * | 12/1996 | Soumiya et al. | 370/234 |
| 5,745,478 | * | 4/1998 | Van Der Wal | 370/234 |
| 5,872,771 | * | 2/1999 | Park et al. | 370/234 |

OTHER PUBLICATIONS

"Effective Bandwidths at Multi–Class Queues", Kelly, *Queueing Systems*, 9, 1991, pp. 5–15.

* cited by examiner

Primary Examiner—Huy D. Vu
(74) Attorney, Agent, or Firm—Arent Fox Kintner Plotkin & Kahn, PLLC

(57) ABSTRACT

A call setup control apparatus has a first calculation unit for calculating an objective value of cell loss ratio $P_B(u)$ of a buffer $B_u$ in priority class u which is equal to or lower than a priority class k (u=k to K), based upon parameters of an average cell rate R(k,j), an objective value of cell loss ratio Q(k,j), and the number of calls N(k,j) for calls of each type j (J=1 to $J_k$) in each class k (=1 to K), with considering a cell rate of calls in priority class which is higher than the class k (class 1 to k−1), when a fresh call is arrived, a unit for obtaining a bandwidth α(k,u,j) required for calls of type j in class k in the buffer $B_u$ to make a cell loss ratio in the buffer $B_u$ to be equal to or less than the objective value $P_B(u)$, a second calculation unit for calculating a required bandwidth C(u) for the buffer $B_u$, based upon the obtained bandwidth α(k,u,j), and a unit for judging whether the fresh call is acceptable or not by comparing the calculated bandwidth C(u) with a link capacity $C_p$.

7 Claims, 10 Drawing Sheets

CALL SETUP CONTROL APPARATUS IN ATM SWITCH

FIELD OF THE INVENTION

The present invention relates to a call setup control apparatus equipped in an ATM (Asynchronous Transfer Mode) switch capable of providing a plurality of services with different QoS (Quality of Service) requirements.

DESCRIPTION OF THE RELATED ART

In ATM networks, priority control and CAC (Call Admission Control) are indispensable traffic management methods to guarantee QOS requirements for different types of traffic, such as voice, video and data. In addition, recent various demands for communication make difficult to previously calculate required bandwidths in the networks which will satisfy the QoS requirements by estimating cell traffic characteristics of the ATM connections of each type in each priority class.

In order to flexibly respond to the various demands for communication and to effectively utilize network resource, it is necessary to correctly grasp the amount of current resource depending upon connection state for calls and to evaluate whether a fresh call is acceptable or not. However, according to the conventional priority control method, influences of higher priority calls over QoS requirements of lower priority calls are not sufficiently considered for providing a plurality of services with the different QOS requirements. Thus, it is impossible to precisely estimate current bandwidth and required bandwidth for accepting a fresh call.

SUMMARY OF THE INVENTION

It is therefore an object of the present invention to provide a call setup control apparatus equipped in an ATM switch, whereby the amount of bandwidth occupied by a plurality of calls with different QoS requirements can be correctly grasped and whether a fresh call is acceptable or not can be suitably evaluated.

The present invention concerns a call setup control apparatus, equipped in an ATM switch with a plurality of buffers for respective priority classes of calls, for providing priority control of calls of a plurality of types with different quality of service requirements. Particularly, according to the present invention, the apparatus has a first calculation unit for calculating an objective value of cell loss ratio $P_B(u)$ of a buffer $B_u$ in priority class u which is equal to or lower than a priority class k (u=k to K), based upon parameters of an average cell rate $R(k,j)$, an objective value of cell loss ratio $Q(k,j)$, and the number of calls $N(k,j)$ for calls of each type j (j=1 to $J_k$) in each class k (=1 to K), with considering a cell rate of calls in priority class which is higher than the class k (class 1 to k−1), when a fresh call is arrived, a unit for obtaining a bandwidth $\alpha(k,u,j)$ required for calls of type j in class k in the buffer $B_u$ to make a cell loss ratio in the buffer $B_u$ to be equal to or less than the objective value $P_B(u)$, a second calculation unit for calculating a required bandwidth $C(u)$ for the buffer $B_u$, based upon the obtained bandwidth $\alpha(k,u,j)$, and a unit for judging whether the fresh call is acceptable or not by comparing the calculated bandwidth $C(u)$ with a link capacity $C_P$.

It is preferred that the first calculation unit includes a third calculation unit for calculating a summation $S(k)$ of the average cell rates $R(k,j)$ of all types 1 to $J_k$ (j=1 to $J_k$) class k (k=1 to K), based upon the parameters of the average cell rates $R(k,j)$ and the number of calls $N(k,j)$, and a determination unit for determining an objective value of cell loss ratio $P_Q(k)$ for calls in the class k to one with the minimum value among the objective value of cell loss ratio $Q(k,j)$ of the type j in the class k, and wherein the objective value of cell loss ratio $P_B(u)$ of class k buffer is calculated in accordance with the summation $S(k)$ of the average cell rates and the objective value of cell loss ratio $P_Q(k)$ for calls in the class k.

The summation $S(k)$ of the average cell rates may be calculated from $$S(k) = \sum_{j=1}^{J_k} N(k, j)R(k, j). \quad \text{Equation (2)}$$

The objective value of cell loss ratio $P_Q(k)$ for calls in the class k may be calculated from $$P_Q(k) = \min_j \{Q(k, j)\}. \quad \text{Equation (1)}$$

The objective value of cell loss ratio $P_B(u)$ may be calculated from $$P_B(u) = \frac{S(u)}{\sum_{i=1}^{u} S(i)} P_Q(u) \quad [u = k, \ldots, K]. \quad \text{Equation (3)}$$

The required bandwidth $C(u)$ for the buffer $B_u$ may be calculated from $$C(u) = \sum_{i=1}^{u} \sum_{j=1}^{J_i} N(i, j)\alpha(i, u, j). \quad \text{Equation (4)}$$

It is also preferred that the apparatus further has control parameter tables for storing the average cell rate $R(k,j)$, the objective value of cell loss ratio $Q(k,j)$, and the number of calls $N(k,j)$ for calls of each type j in each class k, the objective value of cell loss ratio $P_Q(k)$ for calls in the class k, the summation $S(k)$ of the average cell rates $R(k,j)$ in all classes, the objective value of cell loss ratio $P_B(u)$ of the buffer $B_u$, the bandwidth $\alpha(k,u,j)$ required for calls of type j in class k in the buffer $B_u$, and the required bandwidth $C(u)$ for the buffer $B_u$.

The call setup control apparatus of the present invention calculates a required bandwidth for satisfying QoS requirements with respect to calls under priority control by using an effective bandwidth method described in for example F. P. Kelly, "Effective bandwidth at multi-class queues", Queuing Syst. 9, pp.5–15, 1991 so as to enable an optimum call acceptance check for an arbitrary combination of priority of calls, call type and the number of calls in progress.

Further objects and advantages of the present invention will be apparent from the following description of the preferred embodiments of the invention as illustrated in the accompanying drawings.

BRIEF DESCRIPTION OF THE DRAWINGS

FIG. 8, constituted by combining

DESCRIPTION OF THE PREFERRED EMBODIMENTS

Before describing the preferred embodiments of the present invention, basic concept of the invention will be explained with reference to FIGS. 1 to 6.

Figure 1:
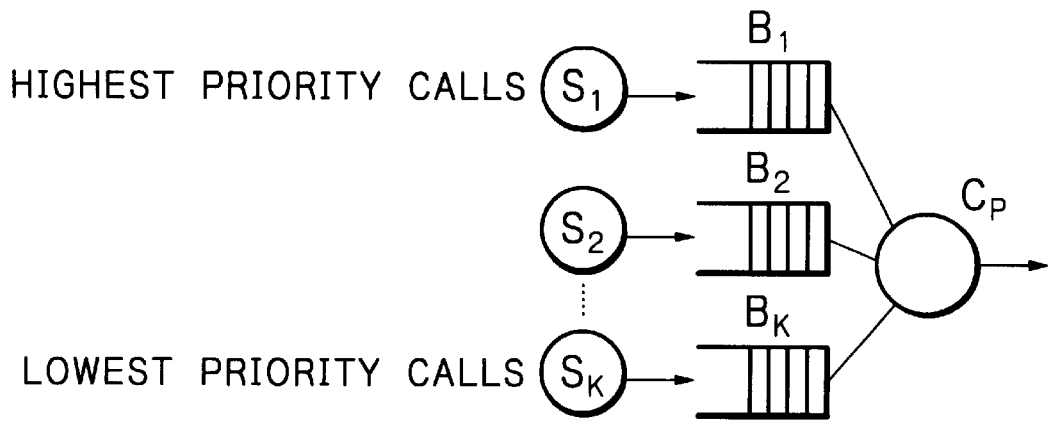
FIG. 1 illustrates a model of a buffer configuration in an ATM switch according to the present invention.

First, it is described with respect to a priority control queue model. FIG. 1 illustrates a model of a buffer (queue) configuration of an ATM switch with priority control. In the figure, $C_p$ denotes a bandwidth (capacity) of an output link connected with a processor and thus is equal to the service rate of the processor, $B_1-B_K$ denote buffers with the respective cell loss priority classes, and $S_1-S_K$ denote calls with the respective cell loss priority classes. In this example, the number of the buffers which share the processor is K. In other words, the ATM switch accommodates K different kinds of connection groups with corresponding K cell loss priority classes. A connection group with cell loss class k (k=1,2, ..., K) is called class k connection according to the QoS requirement in term of cell loss ratio. The smaller the class number implies the higher the priority. Thus, the class 1 connection has the highest priority to be served by the processor, whereas the class K connection has the lowest priority in the connection groups. The service discipline of the processor is first-in-first-out with non-preemptive priority control, and thus the high priority buffer is served whenever it is non-empty. A cell stored in class k buffer $B_k$ will be served only when there is no cell in the buffers $B_1$ to $B_{k-1}$ of class 1,2, ..., k−1. If there is no cell in all the buffers, the processor sends an invalid cell to the link.

Figure 2:
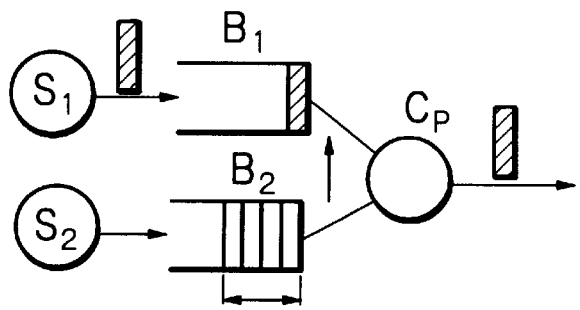
FIG. 2 illustrates behavior of a processor with priority control in the buffer configuration shown in FIG. 1.
Figure 3:
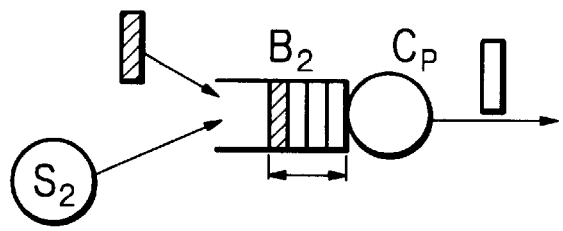
FIG. 3 illustrates the number of cells in a buffer $B_2$ with a priority class 2 in the buffer configuration shown in FIG. 1.
Figure 4:
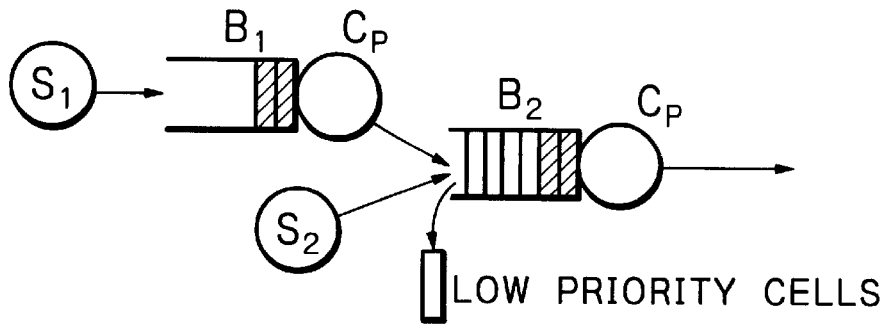
FIG. 4 illustrates a model for probability density function of the number of cells in the buffer $B_2$ in the buffer configuration shown in FIG. 1.
Figure 5:
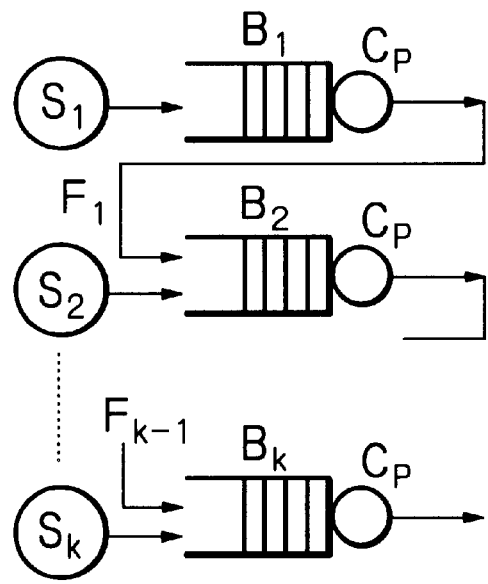
FIG. 5 illustrates a model for probability density function of the number of cells in a buffer $B_K$ with a priority class k in the buffer configuration shown in FIG. 1.
Figure 6:
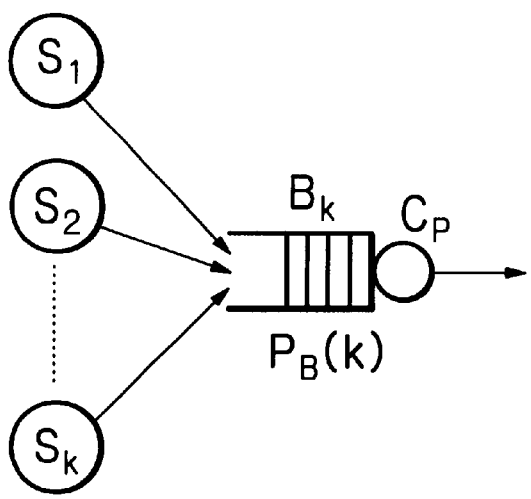
FIG. 6 illustrates a model for the estimation of required bandwidth.

FIG. 2 illustrates behavior of the processor for an example of two-priority case. It is assumed that a cell comes into the high priority class (class 1) buffer $B_1$ while the low priority class (class 2) buffer $B_2$ is not empty. According to the priority control discipline, the processor begins to serve the high priority buffer $B_1$ and cells in the low priority buffer $B_2$ stay in their buffer $B_2$ until the high priority buffer $B_1$ is served and becomes empty. From the view point of the number of cells stored in the low priority buffer $B_2$, a cell arrival to the high priority buffer $B_1$ is equivalent to a situation that the low priority buffer $B_2$ is served by the processor while a cell comes into the low priority buffer $B_2$ as shown in FIG. 3. Therefore, in order to estimate the distribution of the number of cells in the low priority buffer $B_2$, the prioritized parallel queue model shown in FIG. 2 can be transformed into the non-prioritized tandem queue model shown in FIG. 4. This transformation of queuing models can be recursively applied from the top priority buffer $B_1$ to a class k buffer $B_k$ and it results in the tandem queuing model shown in FIG. 5. It should be noted that each buffer is a push-out buffer such that overflowed cells in class k buffer $B_k$ are cells which come from class k sources.

Next, calculation of bandwidth required for accommodating each ATM connection is described. The required service rate $C_k$ of class k buffer $B_k$ is defined as the service rate to make cell loss ratio in the buffer $B_k$ be less than or equal to an objective value of cell loss ratio $P_B(k)$ in the buffer $B_k$. A major problem in estimation of $C_k$ is how to handle the traffic characteristics of the output stream from the buffer $B_{k-1}$. For precise analysis of this traffic, a sophisticated method will be needed to take account traffic inference in upstream buffers in tandem. However, the present invention adopts a single queue model shown in FIG. 6, obtained by simplifying the tandem queue model shown in FIG. 5, in which calls of type j in class k are directly applied to the buffer $B_k$, in other words the output stream of the buffer $B_{k-1}$ is approximated to be aggregated streams of class 1 to k−1 calls. This model has a great advantage of simplicity in the calculation of required bandwidth because it can directly use the effective bandwidth method.

It should be noted that the present invention adopts the above-mentioned concept to the call setup control apparatus equipped in the ATM switch for providing a plurality of services with different QoS requirements.

Figure 7:
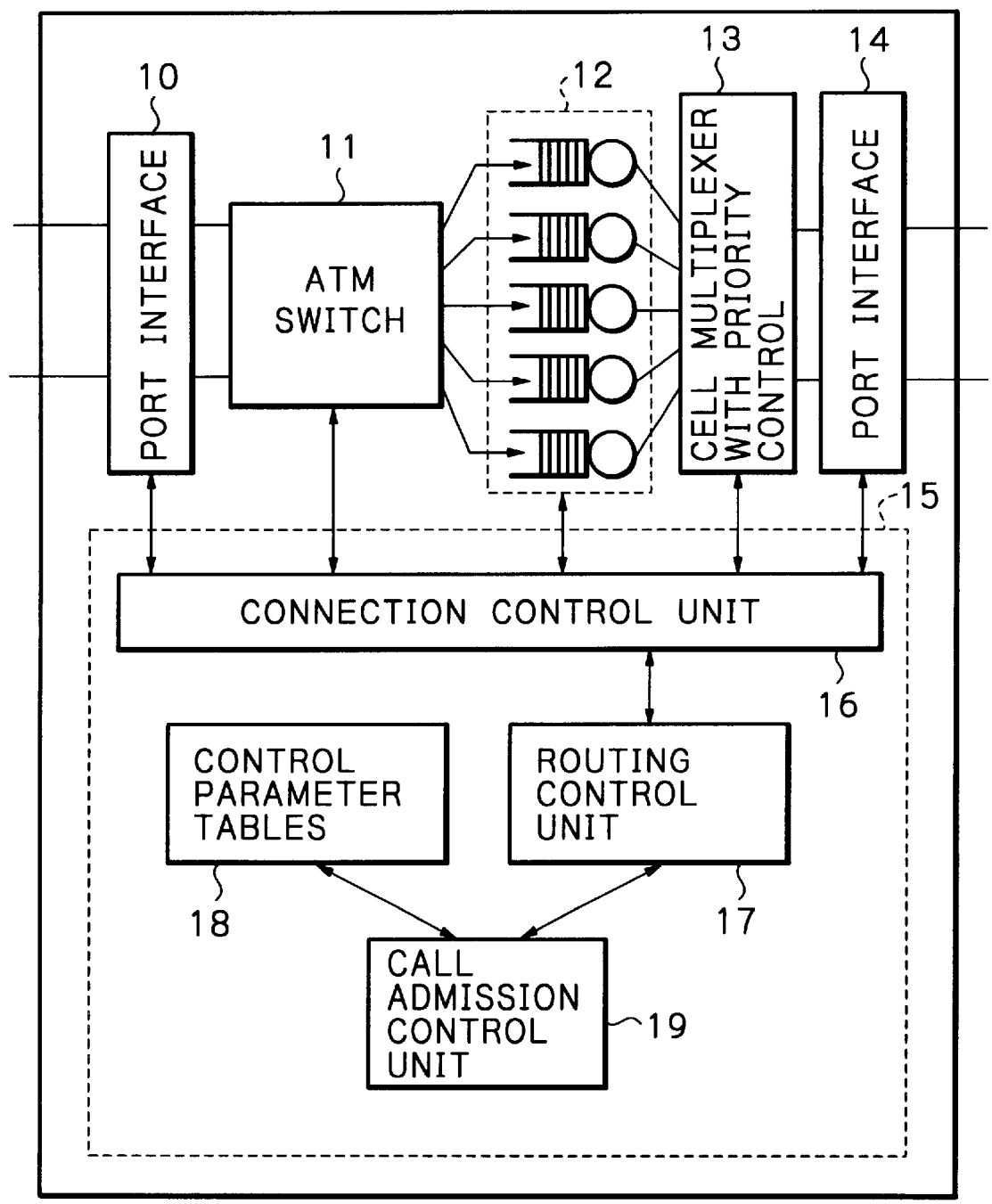
FIG. 7 shows a block diagram schematically illustrating a preferred embodiment according to the present invention.

FIG. 7 schematically illustrates a preferred embodiment of the ATM switch according to the present invention.

In the figure, reference numerals 10 and 14 denote port interfaces, 11 denotes a cell switch, 12 denotes buffers for respective priorities, 13 denotes a cell multiplexer with priority control, and 15 denotes a connection control apparatus. The connection control apparatus 15 has a connection control unit 16, a routing control unit 17 for executing typical traffic control, i.e. priority control and route control of calls, control parameter tables 18, and a call admission control unit 19 for evaluating whether a fresh call is admitted or not by using the control parameter tables 18.

Figure 8A:
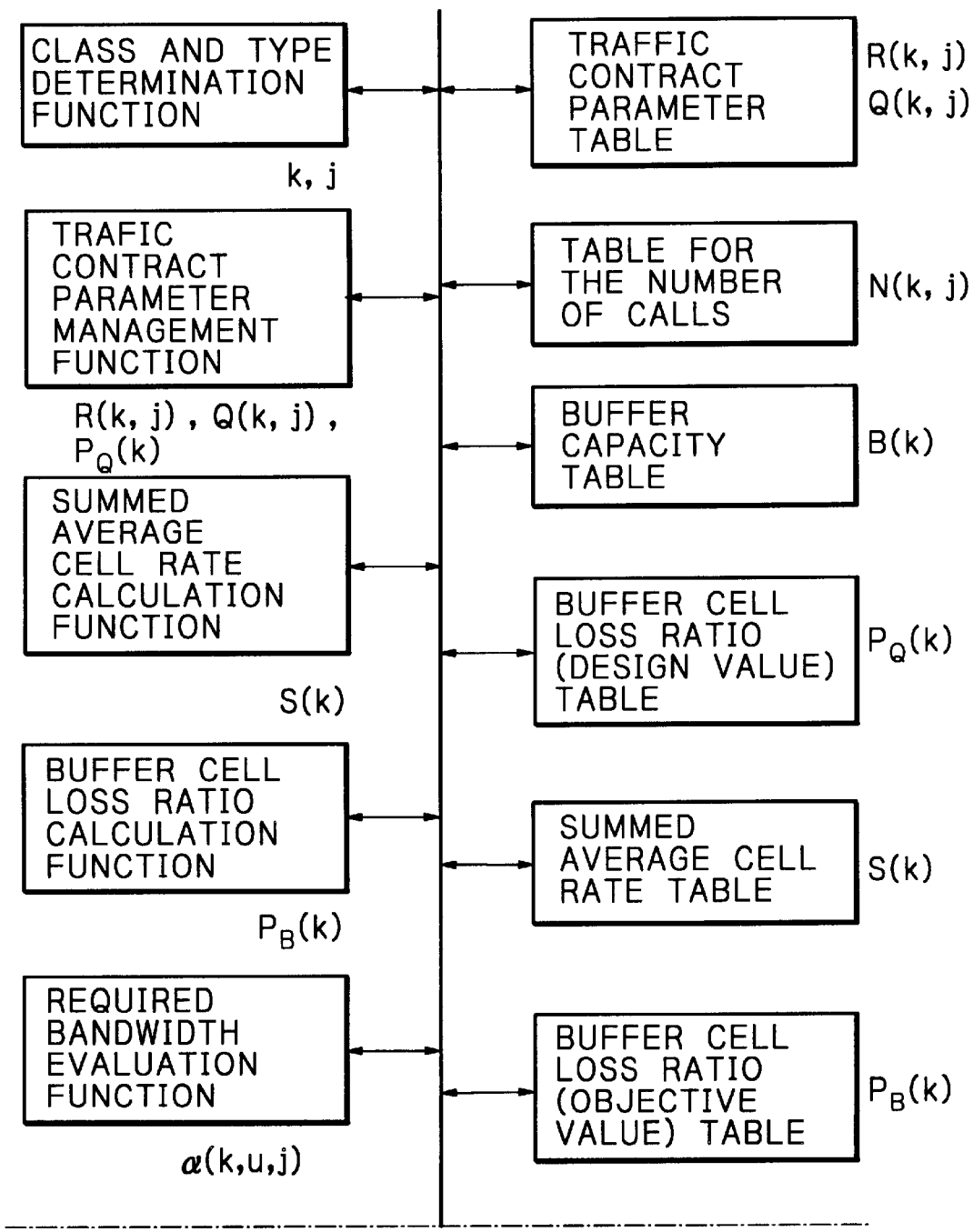
FIGS. 8A and 8B, illustrates functions of a call admission control unit and control parameter tables in the embodiment shown in FIG. 7.
Figure 8B:
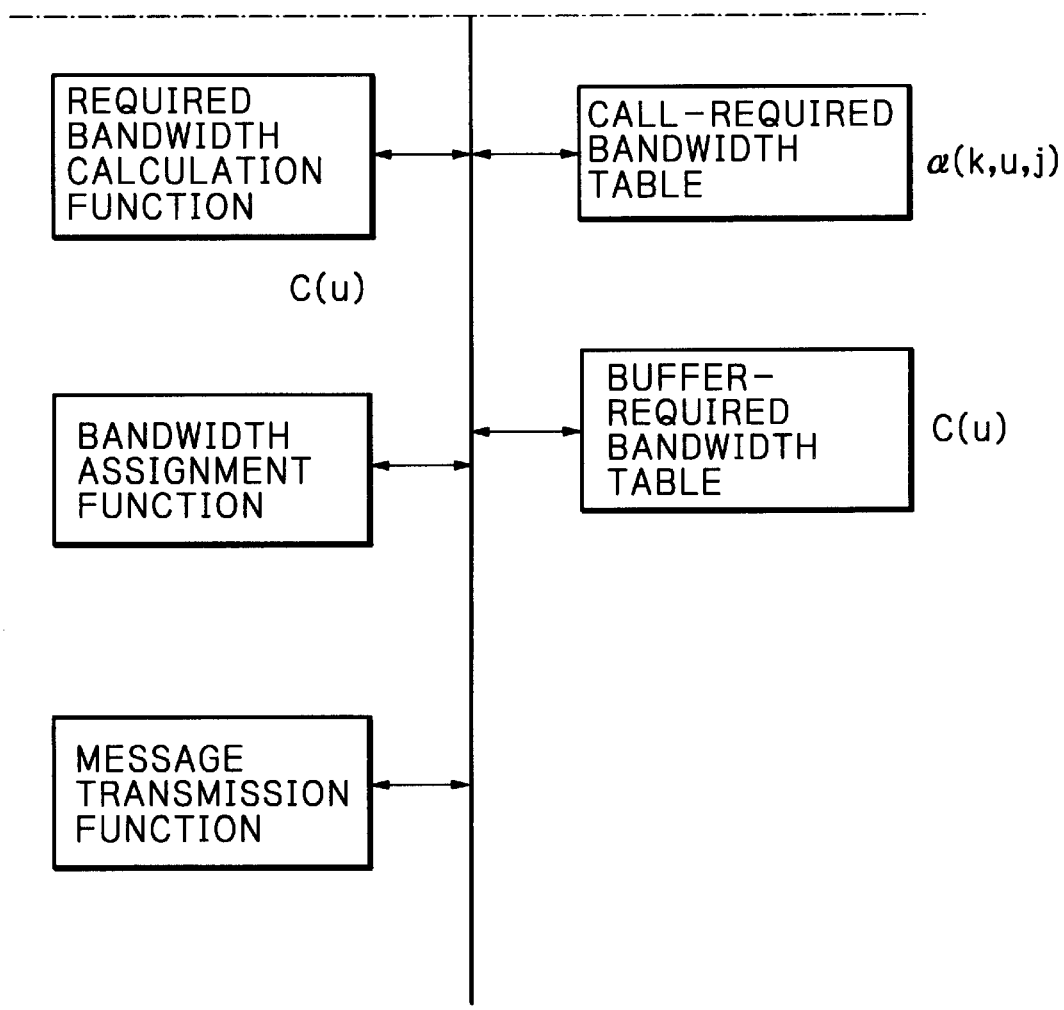

FIG. 8 illustrates functions of the call admission control unit 19 in the left side and the control parameter tables 18 in the right side.

A traffic contract parameter table stores information of service in each class k (k=1 to k) and call type j (j=1 to $j_k$), average cell rate R(k,j) of each type j in each class k, and the objective value of cell loss ratio Q(k,j) of each type j in each class k as shown in following Tables 1 to 3, respectively.

TABLE 1

|  |  | CALL TYPE j | | |
| --- | --- | --- | --- | --- |
|  | CLASS k | 1 | 2 | 3 |
| CBR | 1 | C1 | C2 | C3 |
| rt-VBR | 2 | RV1 | RV2 | RV3 |
| nrt-VBR | 3 | NV1 | NV2 | — |
| ABR | 4 | A1 | A2 | — |
| UBR | 5 | U1 | — | — |

TABLE 2

| R(k,j) | CALL TYPE j | | |
|---|---|---|---|
| CLASS k | 1 | 2 | 3 |
| 1 | 80 | 800 | 1600 |
| 2 | 70 | 140 | 270 |
| 3 | 80 | 400 | — |
| 4 | 100 | 200 | — |
| 5 | 10 | — | — |

TABLE 3

| Q(k,j) | CALL TYPE j | | |
|---|---|---|---|
| CLASS k | 1 | 2 | 3 |
| 1 | 1.00E-08 | 1.00E-07 | 8.00E-07 |
| 2 | 5.00E-06 | 1.00E-05 | 2.00E-05 |
| 3 | 1.00E-05 | 2.00E-05 | — |
| 4 | 1.00E-05 | 2.00E-05 | — |
| 5 | 1.00E-03 | — | — |

A table for the number of calls stores the number of calls $N(k,j)$ of each type j in each class k as shown in Table 4.

TABLE 4

| N(k,j) | CALL TYPE j | | |
|---|---|---|---|
| CLASS k | 1 | 2 | 3 |
| 1 | 56 | 12 | 4 |
| 2 | 12 | 17 | 7 |
| 3 | 8 | 26 | — |
| 4 | 20 | 25 | — |
| 5 | 32 | — | — |

A buffer capacity table stores capacity or size $B(k)$ of the buffer $B_k$ as shown in table 5.

TABLE 5

| CLASS k | B(k) |
|---|---|
| 1 | 50 |
| 2 | 100 |
| 3 | 150 |
| 4 | 200 |
| 5 | 500 |

A buffer cell loss ratio (design value) table stores the design value of cell loss ratio $P_Q(k)$ with respect to calls using the buffer $B_K$ as shown in table 6. This $P_Q(k)$ is expressed by the following equation (1).

$$P_Q(k) = \min_{j}\{Q(k, j)\} \quad \text{Equation (1)}$$

TABLE 6

| CLASS k | $P_Q$ (k) |
|---|---|
| 1 | 1.00E-07 |
| 2 | 5.00E-06 |
| 3 | 1.00E-05 |

TABLE 6-continued

| CLASS k | $P_Q$ (k) |
|---|---|
| 4 | 1.00E-05 |
| 5 | 1.00E-03 |

A summed average cell rate table stores the summation of the average value of cell rate $S(k)$ in class k as shown in Table 7. This $S(k)$ is expressed by the following equation (1).

$$S(k) = \sum_{j=1}^{J_k} N(k, j) R(k, j) \quad \text{Equation (2)}$$

TABLE 7

| CLASS k | S(k) |
|---|---|
| 1 | 20480 |
| 2 | 5110 |
| 3 | 11040 |
| 4 | 7000 |
| 5 | 320 |

A buffer cell loss ratio (objective value) table stores the objective value of cell loss ratio $P_B(k)$ with respect to calls using the buffer $B_k$ as shown in Table 8. This $P_B(k)$ is expressed by the following equation (3).

$$P_B(u) = \frac{S(u)}{\sum_{i=1}^{u} S(i)} P_Q(u) \quad [u = k, \ldots, K] \quad \text{Equation (3)}$$

TABLE 8

| CLASS k | $P_B$ (k) |
|---|---|
| 1 | 1.00E – 07 |
| 2 | 9.98E – 07 |
| 3 | 3.01E – 06 |
| 4 | 1.60E – 06 |
| 5 | 7.28E – 06 |

A call-required bandwidth table stores the bandwidth $\alpha(k,u,j)$ required for call of type j in class k in buffer $B_u$ as shown in Table 9.

TABLE 9

| α (k, u, j) | | CLASS u | | | | |
|---|---|---|---|---|---|---|
| CLASS k | SERVICE | 1 | 2 | 3 | 4 | 5 |
| 1 | C1 | 100 | 95 | 90 | 85 | 80 |
|  | C2 | 1000 | 950 | 900 | 850 | 800 |
|  | C3 | 2000 | 1900 | 1800 | 1700 | 1600 |
| 2 | RV1 | — | 100 | 90 | 80 | 70 |
|  | RV2 | — | 200 | 180 | 160 | 140 |
|  | RV3 | — | 300 | 290 | 280 | 270 |
| 3 | NV1 | — | — | 100 | 90 | 80 |
|  | NV2 | — | — | 500 | 450 | 400 |
| 4 | A1 | — | — | — | 100 | 100 |
|  | A2 | — | — | — | 200 | 200 |
| 5 | U1 | — | — | — | — | 0 |

A buffer-required bandwidth table stores the bandwidth C(u) totally required by the buffer $B_u$ as shown in table 10. This C(u) is expressed by the following equation (4).

$$C(u) = \sum_{i=1}^{u} \sum_{j=1}^{J_i} N(i,j)\alpha(i,u,j) \quad \text{Equation (4)}$$

TABLE 10

| CLASS u | C (u) |
|---|---|
| 1 | 25600 |
| 2 | 31020 |
| 3 | 43010 |
| 4 | 46820 |
| 5 | 13950 |

The call admission control unit 19 has a class and type determination function for determining priority class k and type j of call, a traffic contract parameter management function for registering and managing traffic contract parameters R(k,j) and Q(k,j) which share calls of class k and type j, and $P_Q(k)$, a summed average cell rate calculation function for calculating the summation of the average cell rate S(k), a buffer cell loss ratio calculation function for calculating the objective value of the buffer cell loss ratio $P_B(k)$, a required bandwidth evaluation function for obtaining the call-required bandwidth α(k,u,j), a required bandwidth calculation function for calculating the buffer-required bandwidth C(u), a bandwidth assignment function for assigning the bandwidth for the call, and a message transmission function for notifying whether a call is acceptable or not to another switch.

There are two call admission control schemes. One is that the maximum number of calls is not predetermined. In this scheme, the required service rate of each buffer is calculated at each time of a fresh call arrival to check whether the fresh call is acceptable or not. The other one is that the maximum number of calls is preliminarily designed. In the latter scheme, call admission control is done in such a way that a fresh call is accepted if the number of calls in progress is less than or equal to the designed maximum number otherwise the fresh call is rejected.

Figures 9, 9A, 9B:
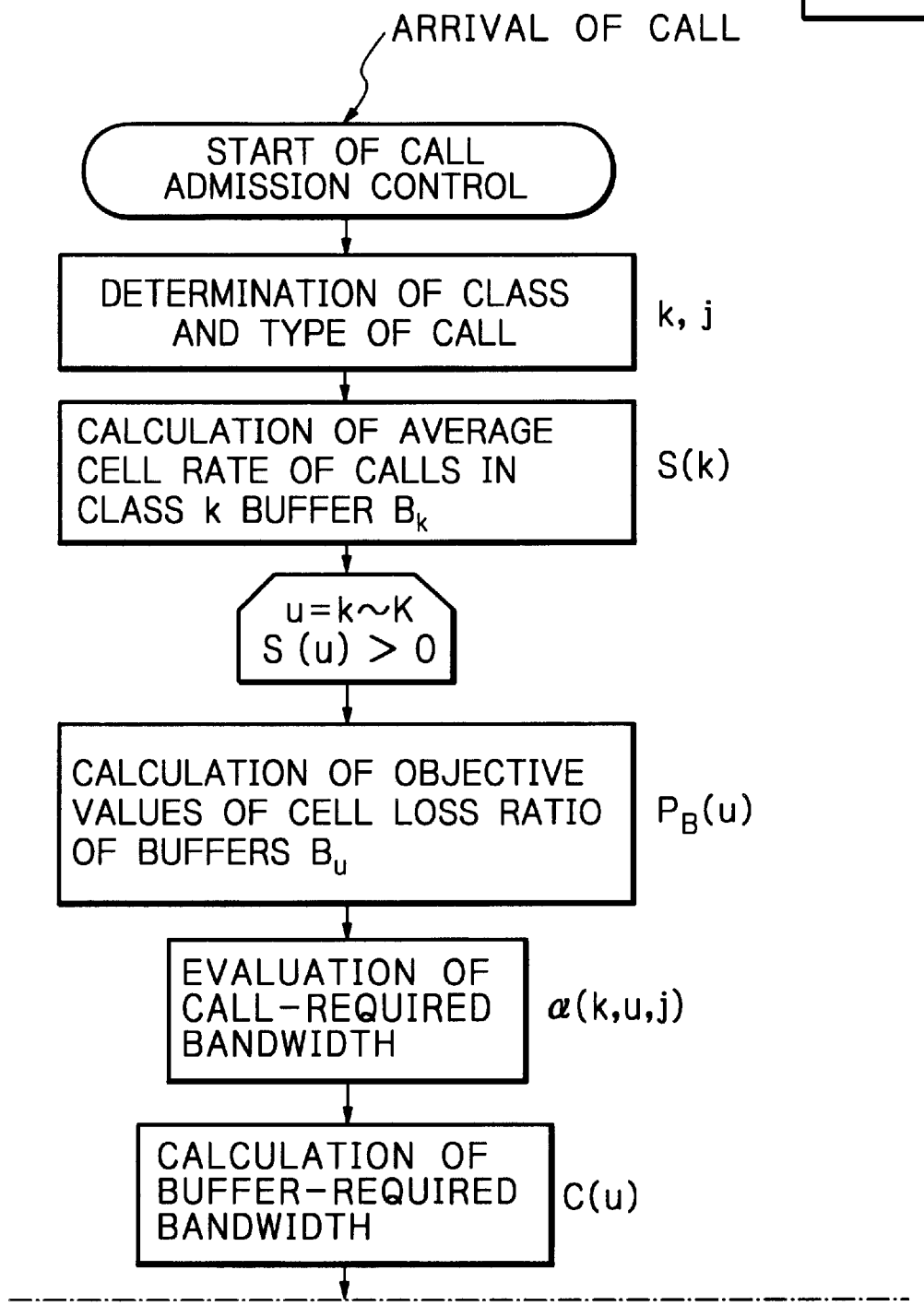
FIG. 9, constituted by combining
FIGS. 9A and 9B, shows a flow chart for checking whether a fresh call is acceptable or not at each time of call arrival.
Figure 9B:
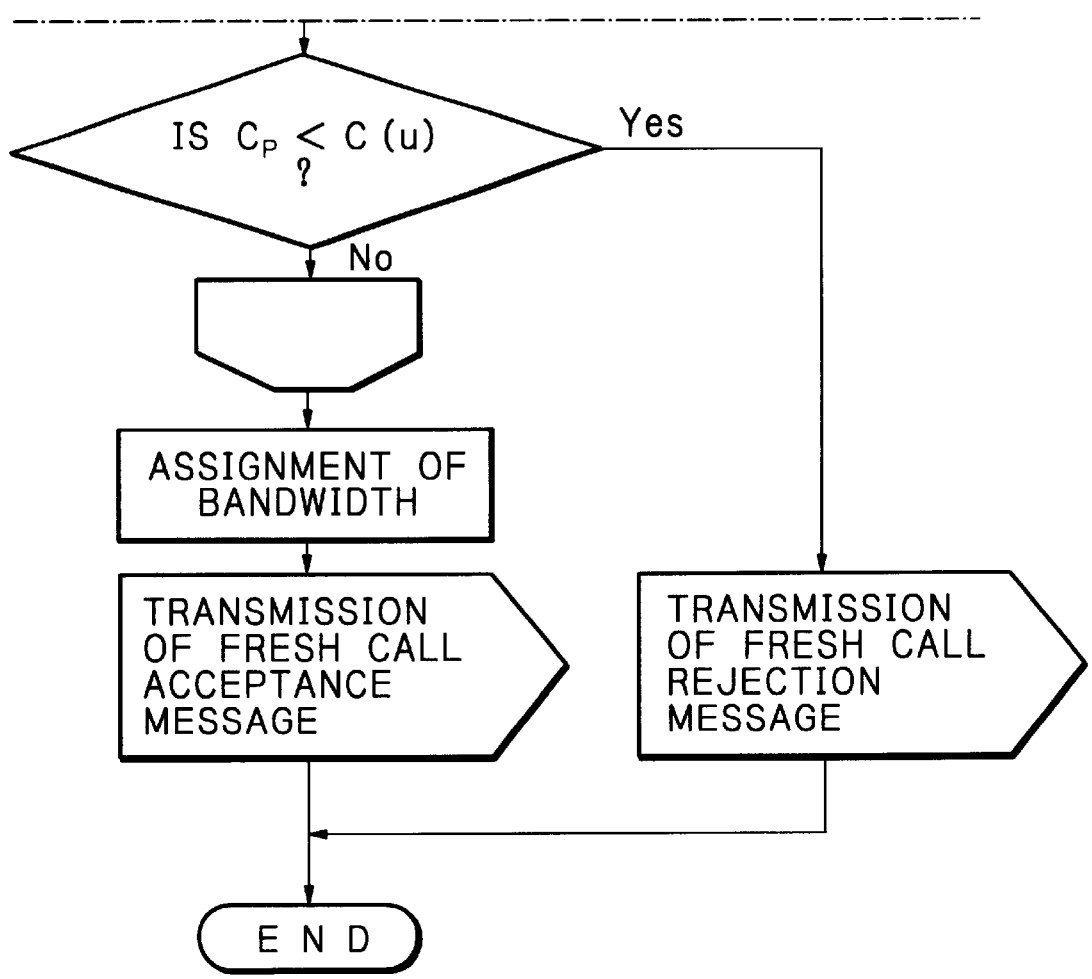

FIG. 9 shows a flow chart of the call admission control, in accordance with the former scheme, to check whether a fresh call is acceptable or not at each time of call arrival.

When a fresh call is arrived, priority class k (k=1 to K) and call type j (j=1 to $J_K$) of the call is first determined by using the class and type determination function. Thus, the average cell rate R(k,j), the objective value of cell loss ratio Q(k,j) and the number of calls N(k,j) which are traffic contract parameters and share calls of type j in class k, and the design value of cell loss ratio $P_Q(k)$ which will be calculated from the equation (1) are determined.

Then, a summation of average cell rate S(k) of calls in the class k buffer $B_k$ is calculated by the average cell rate calculation function. This S(k) is calculated from the equation (2) by using as parameters R(k,j) in the traffic contract parameter table and N(k,j) stored in the call number table. The calculated S(k) is stored in the average cell rate table.

Then, the looped steps with respect to calls of classes u (=k to K) are executed to check whether the calls are acceptable or not.

In the looped steps, first, the objective values of cell loss ratio $P_B(u)$ with respect to all the buffer $B_k$ to $B_K$ (u=k to K) are calculated by the buffer cell loss ratio calculation function. These $P_B(u)$ values are calculated from the equation (3) by using as parameters S(u) stored in the summed average cell rate table and $P_Q(u)$ stored in the buffer cell loss ratio (design value) table. The calculated $P_B(u)$ is stored in the buffer cell loss ratio (objective value) table.

Then, the call-required bandwidth α(k,u,j) is evaluated by the required bandwidth evaluation function. At this step, obtained Is the call-required bandwidth α(k,u,j), where k=1 to K, u=k to K, J=1 to $J_k$, required for calls with class k and call type j in each class u (u=k to K) buffer $B_u$ in order that the cell loss ratio in the class u (u=k to K) buffer $B_u$ is equal to or less than the objective value $P_B(u)$. The obtained call-required bandwidth α(k,u,j) is stored in the call-required bandwidth table.

Then, the bandwidth C(u) totally required by the buffer $B_u$ is calculated by the required bandwidth calculation function. This C(u) is calculated from the equation (4) by using as parameters N(k,j) stored in the call number table and α(k,u,j) stored in the call-required bandwidth table. The calculated C(u) is stored in the buffer-required bandwidth table.

At the final step in the loop, it is judged whether the link capacity $C_p$ is less than the required bandwidth or the required service rate C(u) in this buffer $B_u$ or not. If $C_p<C(u)$, the fresh call is rejected and a fresh call rejection message is transmitted to another switch by the message transmission function. If $C_p$ is equal to or more than C(u), u is incremented by one and then the above-mentioned looped steps are repeated for next class.

If the link capacity $C_p$ is equal to or more than all of the calculated required service rates C(u) of the buffers k to K, the fresh call is accepted and the looped steps are completed. In this case, bandwidth is assigned by the bandwidth assignment function and a fresh call acceptance message is transmitted to another switch by the message transmission function.

Figure 10:
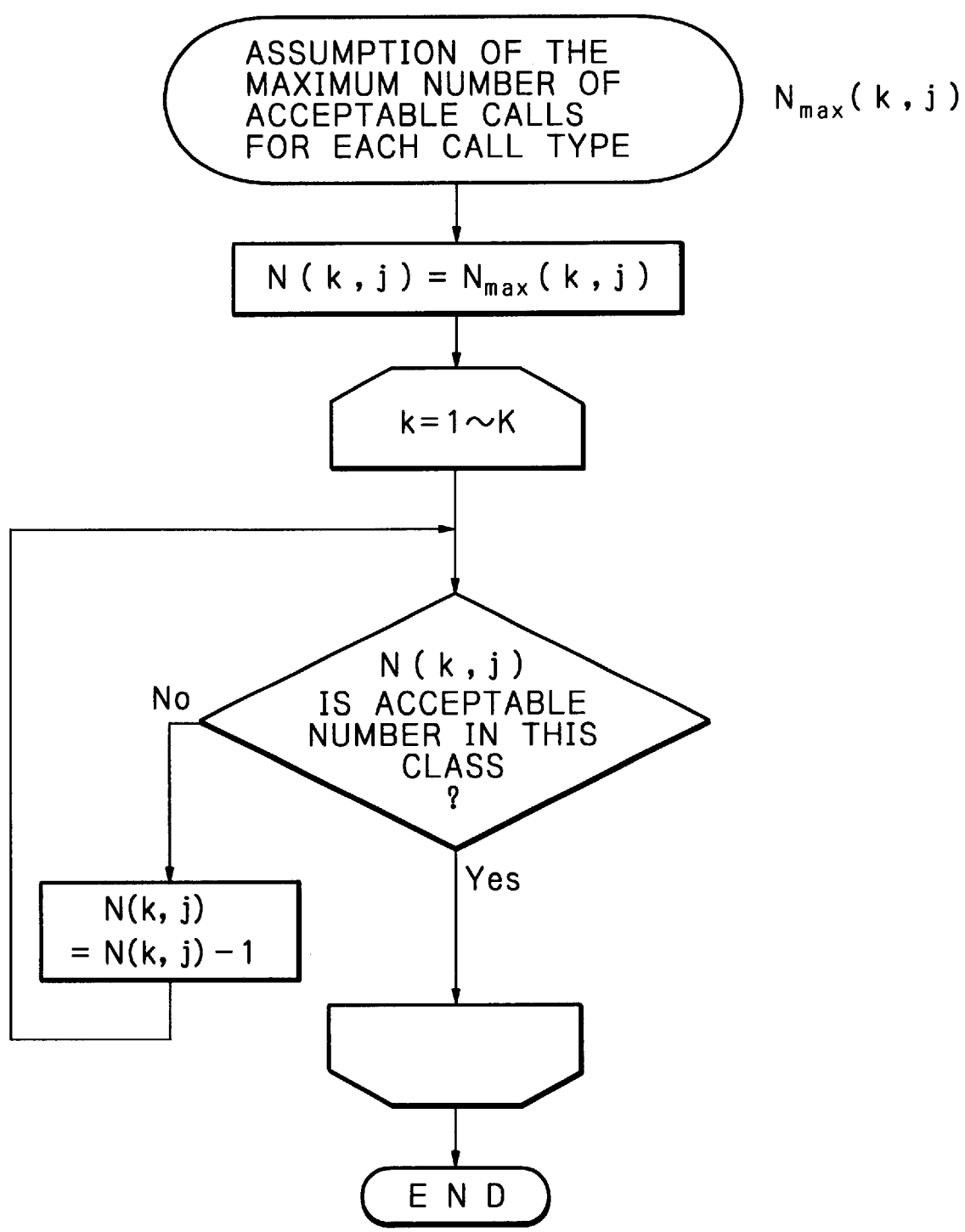
FIG. 10 shows a flow chart for previously calculating the number of acceptable calls at designing.

FIG. 10 shows a flow chart for previously calculating the number of acceptable calls at designing, used in the call admission control in accordance with the latter scheme. In this scheme as aforementioned, the call admission control is done in such a way that a fresh call is accepted if the number of calls in progress is less than or equal to the designed maximum number otherwise the fresh call is rejected.

At designing, the maximum number of acceptable calls for each call type $N_{max}(k,J)$, where J=1 to $J_k$, is preliminarily assumed. The assumed maximum number for each call type $N_{max}(k,j)$ is stored as the number of calls N(k,j).

Then, the looped steps with respect to calls of classes 1 to K are executed to determine the maximum number of acceptable calls for each class. First, whether N(k,j) is acceptable number in this class k or not is executed. If the number of calls N(k,j) is not acceptable in this class k, N(k,j) is reduced by one and the judgment is executed again. If the number of calls N(k,j) is acceptable in this class k, N(k,j) is determined as the maximum number $N_{max}(k,j)$ in this class k and the judgment in next class is executed. Thus, when the looped steps are completed, the maximum numbers of acceptable calls for all classes $N_{max}(k,j)$, where k=1 to K, are determined.

Figure 11:
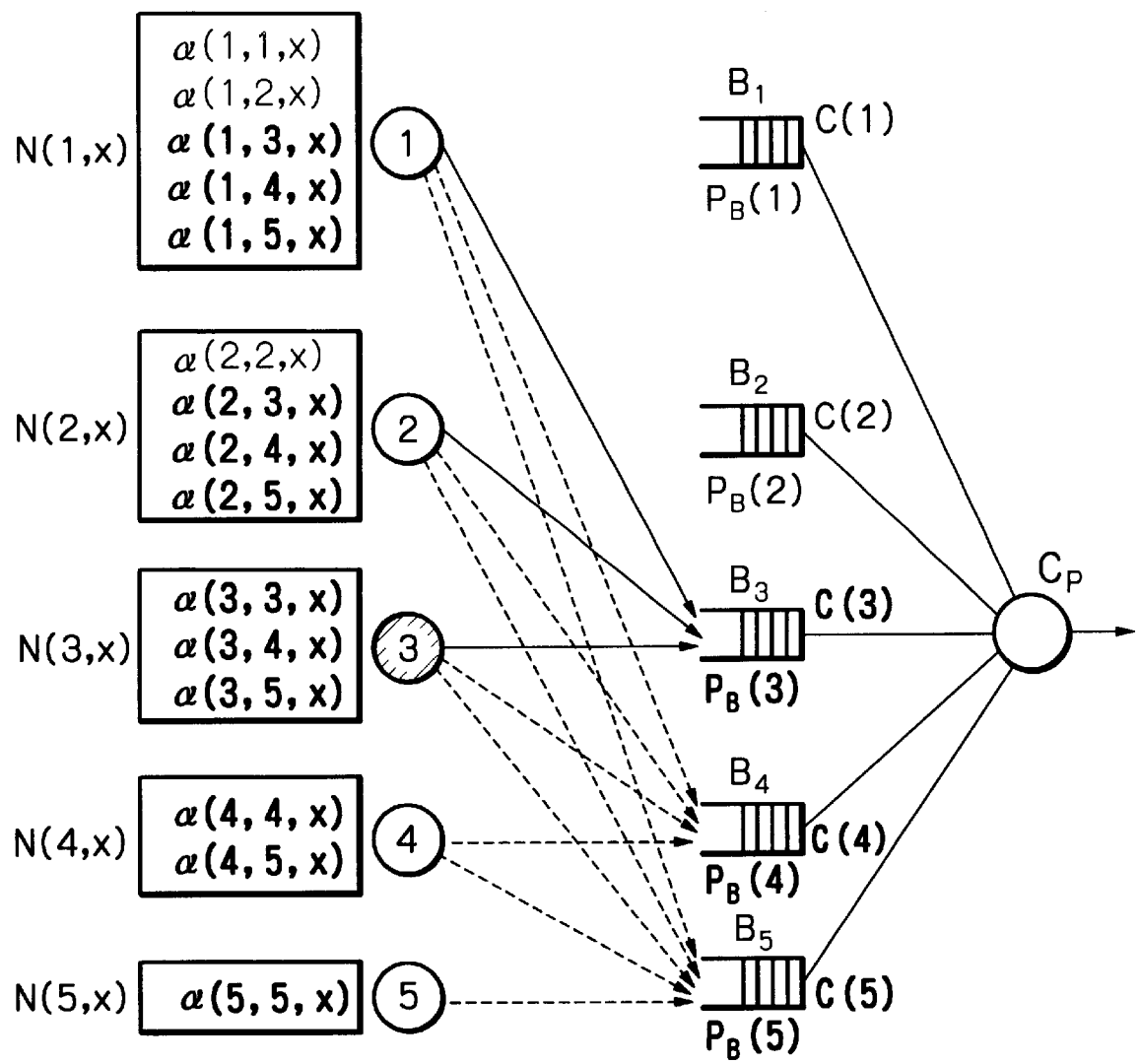
FIG. 11 illustrates call admission control of a fresh call with class 3 in a model with class 1 to 5 buffers.

FIG. 11 illustrates call admission control of a fresh call with class 3 in a model with class 1 to 5 buffers. Hereinafter, numerical example of the call admission control in the model shown in this FIG. 11 will be described with reference to FIG. 9 and Tables 1 to 10.

First, class k and call type j of a fresh call is determined. If this fresh call is a high rate Internet call corresponding to NV2 in Table 1, class k=3 and call type J=2 are determined. Thus, R(3,2)=400 [cells/sec] is determined from Table 2, Q(3,2)=2.00E−05 is determined from Table 3, N(3,2)=26 is determined from Table 4, and B(3)=150 [cells] is determined from Table 5. As expressed in equation (1), $P_Q(3)$ is equal to Q(3,J) of type j in class 3 with the minimum value (Table 3). Therefore, $P_Q(3)$ is determined to $P_Q(3)$=1.00E−05 as shown in Table 6.

Then, the average cell rate S(3) in class 3 is calculated from the equation (2) as follows;

$$S(3) = R(3,1) + (N(3,1) + R(3,2) \times N(3,2)$$
$$= 80 \times 8 + 400 \times 26$$
$$= 11040.$$

The calculated value is stored in the average cell rate table of Table 7.

Then, the looped steps with respect to calls with classes equal to or lower than class 3, i.e. u=3,4,5, are executed to check whether the calls are acceptable into the bandwidth or not.

In the looped steps, first, $P_B(3)$ is calculated from the equation (3) as follows;

$$PB(3) = S(3)/\{S(1) + S(2) + S(3)\} \times P_Q(3)$$
$$= 11040/\{20480 + 5110 + 11040\} \times (1.00E - 05)$$
$$= 3.01E - 06.$$

The calculated value is stored in the buffer cell loss ratio (objective value) table of Table 8.

Then, the call-required bandwidth $\alpha(k,u,j)$ where k=1 to 5, u=3 to 5 and j=1 to $J_5$ obtained by using $P_B(3)$. In FIG. 11, boldface symbols indicate updated bandwidths $\alpha(k,u,j)$. The obtained call-required bandwidths $\alpha(k,u,j)$ are stored in the call-required bandwidth table of Table 9.

Then, the bandwidth C(3) totally required by the buffer $B_3$ is calculated from the equation (4) by using as parameters stored in the call number table and the call-required bandwidth table. The calculated C(3) is stored In the buffer-required bandwidth table of Table 10.

At the final step in the loop, whether the link capacity $C_p$ is less than the required bandwidth C(3)=43010 in this buffer $B_3$ or not. If $C_p$ <C(3), the fresh call is rejected and the fresh call rejection message is transmitted to finish the call admission control. If $C_p$ is equal to or more than C(3), the above-mentioned looped steps are repeated for next lower class. In FIG. 11, boldface parameters indicate parameters updated in the looped steps.

Figure 12:
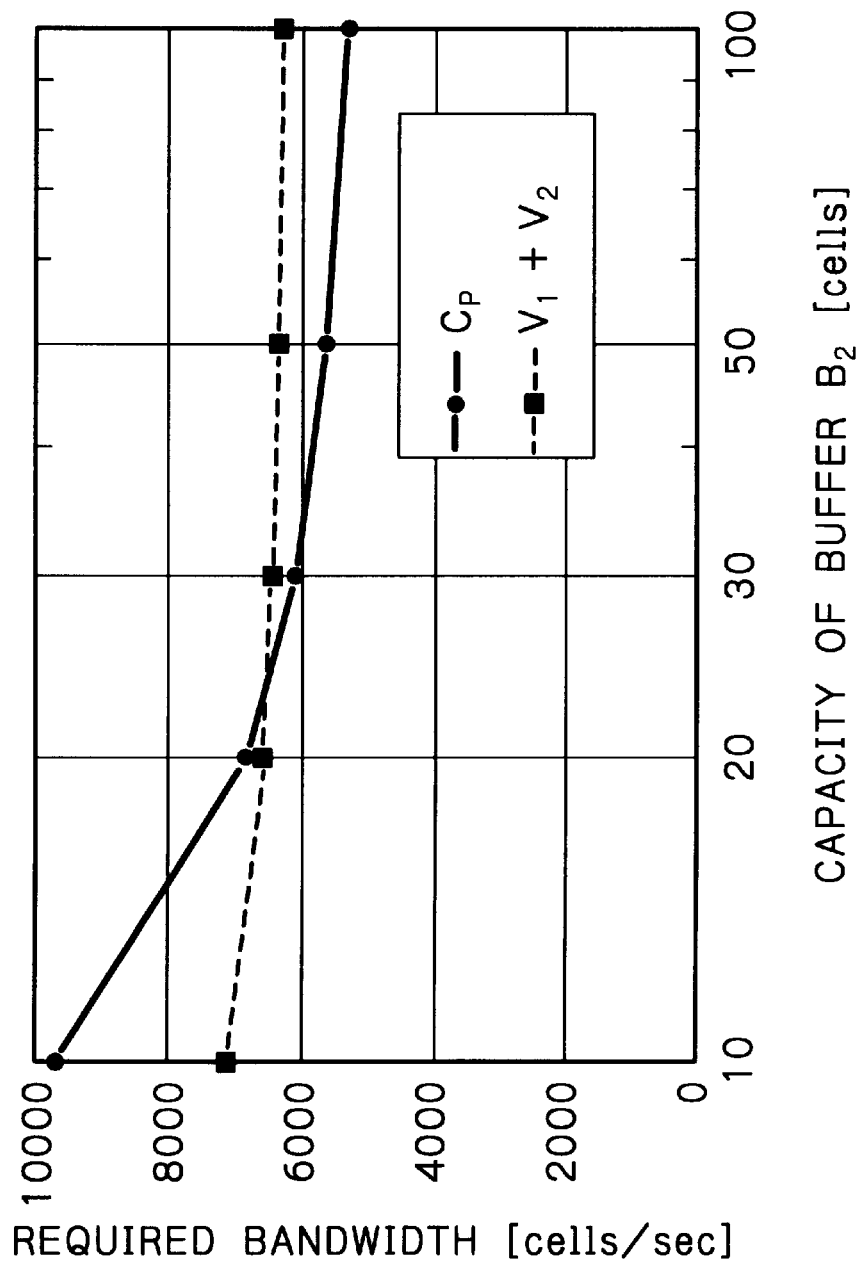
FIG. 12 shows a graph illustrating required bandwidth with varying the capacity of class 2 buffer $B_2$.

FIG. 12 shows a graph illustrating required bandwidth with varying the size of class 2 buffer $B_2$. In the figure, a solid line represents the required link capacity $C_p$ and a dashed line shows the total required bandwidth of all connections $V_1+V_2$, where $$V_k = \sum_{j=1}^{J_k} N(k, j)\alpha(k, k, j)$$

that corresponds to the total required bandwidth of class k calls in class k buffer. With reference to FIG. 12, an example for calculating the required bandwidth in case that calls in two priority classes are arrived at the ATM switch in class k=2 will be described.

It is assumed that cell arrivals of each connection are Poissonean with respective arrival rates, that summation of the average cell rates in class 1 and class 2 are S(1)=4000 [cells/sec] and S(2)=1000 [cells/sec], and that the objective values of cell loss ratio are Q(1)=Q(2)=$10^{-5}$. The size of the class 1 buffer $B_1$ is assumed as B(1)=20 [cells]. The VP bandwidth for each class $V_k$ and the required link capacity $C_p$ when the size of the class 2 buffer $B_2$ is varied as B(2)=10 to 100 are obtained. It will be noted from FIG. 12 that the required link capacity $C_p$ is decreased when the objective value of cell loss ratio in the buffer $B_2$ or the size of the buffer $B_2$ increased. Also, the required link capacity $C_p$ becomes smaller than the total required cell rate of connections $V_1+V_2$ when the size of the buffer $B_2$ is larger than 30 cells. This is because the required bandwidth for class 1 calls in the buffer $B_2$ denoted by $\alpha(1,2,1)$ is smaller than that in the buffer $B_1$ denoted by a(1,1,1) when the buffer capacity B(2) becomes larger than 30 cells.

Thus, according to the present invention, influences of higher priority calls over QoS requirements of lower priority calls are sufficiently considered for providing a plurality of services with the different QOS requirements. As a result, it is possible to precisely estimate bandwidth in progress and required bandwidth due to acceptance of a fresh call.

Many widely different embodiments of the present invention may be constructed without departing from the spirit and scope of the present invention. It should be understood that the present invention is not limited to the specific embodiments described in the specification, except as defined in the appended claims.

What is claimed is:

1. A call setup control apparatus, equipped In an ATM switch with a plurality of buffers for respective priority classes of calls, for providing priority control of calls of a plurality of types with different quality of service requirements, said apparatus comprising:

a first calculation means for calculating an objective value of cell loss ratio $P_B(u)$ of a buffer $B_u$ in priority class u which is equal to or lower than a priority class k (u=k to K), based upon parameters of an average cell rate R(k,j), an objective value of cell loss ratio Q(k,j), and the number of calls N(k,j) for calls of each type j (j=1 to $J_k$) in each class k (=1 to K), with considering a cell rate of calls in priority class which is higher than the class k (class 1 to k−1), when a fresh call is arrived;

means for obtaining a bandwidth $\alpha(k,u,j)$ required for calls of type j in class k in the buffer $B_u$ to make a cell loss ratio in the buffer $B_u$ to be equal to or less than the objective value $P_B(u)$;

a second calculation means for calculating a required bandwidth C(u) for the buffer $B_u$, based upon the obtained bandwidth $\alpha(k,u,j)$; and means for judging whether the fresh call is acceptable or not by comparing the calculated bandwidth C(u) with a link capacity $C_P$.

2. The apparatus as claimed in claim 1, wherein said first calculation means includes a third calculation means for calculating a summation S(k) of the average cell rates R(k,j) of all types 1 to $J_k$ (j=1 to $J_k$) in class k (k=1 to K), based upon the parameters of the average cell rates R(k,j) and the number of calls N(k,j), and a determination means for determining an objective value of cell loss ratio $P_Q(k)$ for calls in the class k to one with the minimum value among the objective value of cell loss ratio Q(k,j) of the type j in the class k, and wherein the objective value of cell loss ratio $P_B(u)$ of class k buffer is calculated in accordance with the summation S(k) of the average cell rates and the objective value of cell loss ratio $P_Q(k)$ for calls in the class k.

3. The apparatus as claimed in claim 2, wherein the summation S(k) of the average cell rates is calculated from $$S(k) = \sum_{j=1}^{J_k} N(k, j)R(k, j).  \quad \text{Equation (2)}$$

4. The apparatus as claimed in claim 2, wherein the objective value $P_Q(k)$ of cell loss ratio in the class k is calculated from $$P_Q(k) = \min_j \{Q(k, j)\}.  \quad \text{Equation (1)}$$

5. The apparatus as claimed in claim 2, wherein the objective value of cell loss ratio $P_B(u)$ is calculated from $$P_B(u) = \frac{S(u)}{\sum_{i=1}^{u} S(i)} P_Q(u) \quad [u = k, \ldots, K].  \quad \text{Equation (3)}$$

6. The apparatus as claimed in claim 1, wherein the required bandwidth C(u) for the buffer $B_u$ is calculated from $$C(u) = \sum_{i=1}^{u} \sum_{j=1}^{J_i} N(i, j)\alpha(i, u, j).  \quad \text{Equation (4)}$$

7. The apparatus as claimed in claim 1, wherein said apparatus further comprises control parameter tables for storing the average cell rate R(k,j), the objective value of cell loss ratio Q(k,j), and the number of calls N(k,j) for calls of each type j in each class k, the objective value $P_Q(k)$ of cell loss ratio in the class k, the summation S(k) of the average cell rates R(k,j) in all classes, the objective value of cell loss ratio $P_B(u)$ of the buffer $B_u$, the bandwidth $\alpha(k,u,j)$ required for calls of type j in class k in the buffer $B_u$, and the required bandwidth C(u) for the buffer $B_u$.

\* \* \* \* \*